United States Patent [19]

Satoh

[11] Patent Number: 4,777,448

[45] Date of Patent: Oct. 11, 1988

[54] FREQUENCY MULTIPLYING CIRCUIT

[75] Inventor: Nakatoshi Satoh, Tokyo, Japan

[73] Assignee: Fujitsu Limited, Kawasaki, Japan

[21] Appl. No.: 39,225

[22] Filed: Apr. 17, 1987

[30] Foreign Application Priority Data

Apr. 18, 1986 [JP] Japan .................. 61-090357

[51] Int. Cl.⁴ .................. H03K 5/26; H03L 7/24
[52] U.S. Cl. .................. 328/138; 328/112;
328/140; 377/47; 307/522; 307/234
[58] Field of Search .......... 328/134, 110, 111, 112,
328/138, 140; 307/234, 522; 377/47

[56] References Cited

U.S. PATENT DOCUMENTS

| | | | |
|---|---|---|---|
| 3,555,434 | 1/1971 | Sheen | 328/112 |
| 3,980,960 | 9/1976 | Hutchinson | 307/234 |
| 4,004,234 | 1/1977 | Cardon et al. | 328/138 |
| 4,344,038 | 8/1982 | Streeter | 328/138 |
| 4,360,782 | 11/1982 | Nowell | 328/138 |

Primary Examiner—John S. Heyman

Attorney, Agent, or Firm—Staas & Halsey

[57] ABSTRACT

A frequency multiplying circuit for a disc controller includes a first time counting unit responsive to input pulse signals for producing a first detection signal when a HIGH level of the input pulse signals is longer than a predetermined length, a second time counting unit responsive to the input pulse signals for producing a second detection signal when a LOW level of the input pulse signals is longer than a predetermined length, and a gate timing determination unit responsive to the produced first and second detection signals for providing a gate signal in response to the first detection signal and for providing another gate signal in response to the second detection signal. First and second pulses are generated responsive to the gate signals and to rising or falling edges of the input signals for providing a frequency multiplied output of the input pulse signals. Frequency multiplication of the input pulse signals is thereby prohibited when the frequency of the input pulse signals is higher than a predetermined frequency.

9 Claims, 7 Drawing Sheets

Fig. 6 CASE-3

4,777,448

FREQUENCY MULTIPLYING CIRCUIT

BACKGROUND OF THE INVENTION

Field of the Invention

The present invention relates to a frequency multiplying circuit. The frequency multiplying circuit according to the present invention can be applied, for example, to read signal generation in a disc controller used such as that for a floppy-disc used in a personal computer.

Description of the Related Art

In general, digital data with FM type modulation, modified FM type modulation (MFM type) and the like, stored in a disc memory as of a computer, is reproduced by a reproducing device having a phase locked loop circuit, a frequency multiplying circuit, and a data reading circuit.

The phase locked loop circuit extracts a clock signal from the reproduced signal. The frequency multiplying circuit multiplies the extracted clock signal by two. The frequency multiplied signal is then supplied as a data read clock signal to the data reading circuit. The data reading circuit reads the clock bits and data bits from the reproduced signal by using the data read clock signal.

Usually, in frequency multiplier circuits used for disc controllers, the oscillation frequency of the phase locked loop circuit is subject to considerable change by a lock-in process with regard to a regenerative signal, the frequency of the produced clock signal is also subject to considerable change. As the frequency of the clock signal increases, the lengths of LOW potential level periods become quite short, causing the frequency of the output signal to be considerably high. This high frequency of the output signal will cause an abnormal operation of the data reading circuit, and prevent a data reading circuit from normal operation.

Accordingly, problems have occurred in that the clock bits and data bits cannot be read, and that an error signal indicating an error in data reading cannot be generated.

SUMMARY OF THE INVENTION

It is an object of the present invention to provide an improved frequency multiplying circuit, applicable to a disc controller, which produces an output signal having a frequency within the upper limit frequency of the subsequent data reading circuit, to prevent an abnormal operation of that circuit.

In accordance with the present invention there is provided a frequency multiplying circuit including: a first time counting unit responsive to input pulse signals for producing a first detection signal when a HIGH level period of the input pulse signal is longer than a predetermined length; a second time counting unit responsive to the input pulse signals for producing a second detection signal when a LOW level period of the input pulse signals is longer than a predetermined length; and a pulse generation determining unit responsive to the produced first and second detection signals for realizing a SET state by the produced first detection signal and realizing a RESET state by the produced second detection signal to generate respective gate signals. The frequency multiplying circuit also includes a first pulse generating unit responsive to one of the generated gate signals for detecting a rising edge of the input pulse signals and for generating first pulses; a second pulse generating unit responsive to the other of the generated gate signals for detecting a falling edge of the input pulse signals and for generating second pulses. The first and second pulses being delivered as frequency multiplied signals of the input pulse signals. Thus, the frequency multiplication of the input pulse signals is prohibited when the frequency of the input pulse signals is higher than a predetermined frequency.

DESCRIPTION OF THE PREFERRED EMBODIMENT

Figure 1:
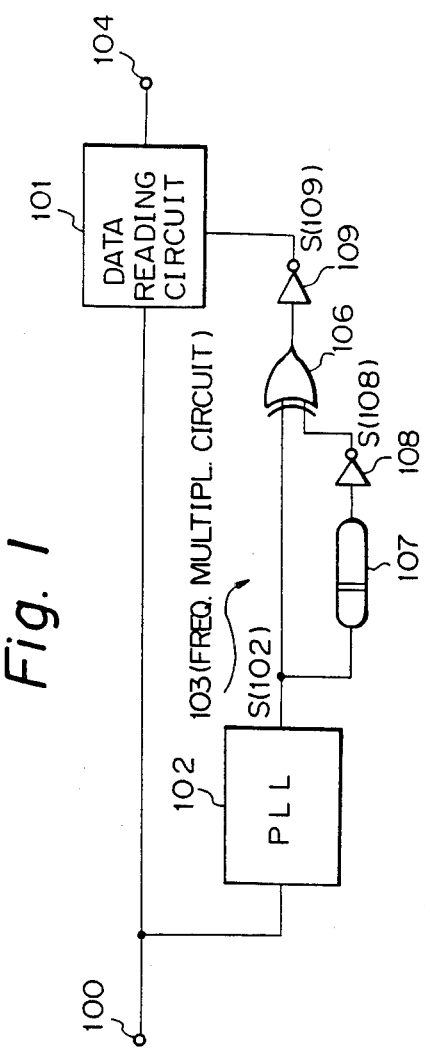
FIG. 1 shows a prior art disc controller including a frequency multiplier circuit.

Before describing the preferred embodiment of the present invention, a disc controller including a frequency multiplier circuit is described with reference to FIGS. 1 and 2. The disc controller shown in FIG. 1 includes an input terminal 100, a data reading circuit 101, a phase locked loop circuit 102, and a frequency multiplying circuit 103 having a delay circuit 107, an inverter 108, an exclusive OR gate 106, and an inverter 109.

The clock signal S(102) as the output of the phase locked loop circuit 102 is supplied to one input terminal of the exclusive OR gate 106 and to the delay circuit 107. The output of the delay circuit 107 is supplied to the inverter 108 which produces the inverted signal S(108) to be supplied to the other input terminal of the exclusive OR gate 106. The output of the exclusive OR gate 106 is supplied to the inverter 109 which produces the inverted signal S(109) to be supplied to one input terminal of the data reading circuit 101.

Figure 2:
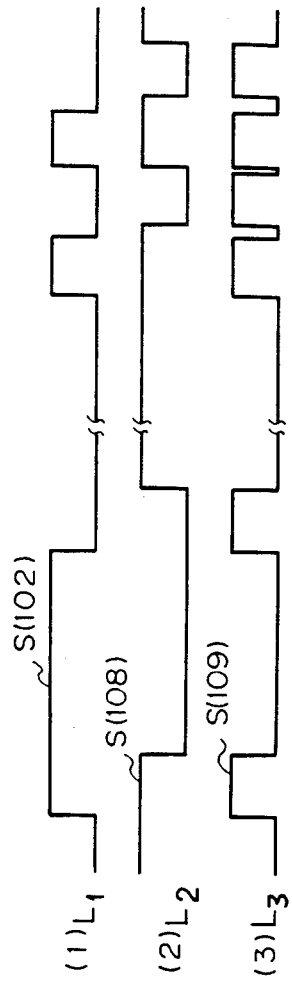
FIG. 2 shows waveforms of the signals in the disc controller of FIG. 1.

The waveforms of the signals S(102), S(108), and S(109) are shown in FIG. 2. The pulses S(109) are produced at the rising edges and the falling edges of the clock pulses S(102). Thus, the frequency of the pulses S(109) is twice that of the pulses S(102).

In practice, in the circuit shown in FIG. 1, the oscillation frequency of the phase locked loop circuit 12 is subject to considerable change by a lock-in process with regard to a regenerative signal, so that the frequency of the clock signal S(102) is also subject to considerable change.

As the frequency of the clock signal S(102) increases, as shown in the right part of waveform (1) in FIG. 2, the lengths of the LOW level potential periods L1, L2, and L3 become quite short, as shown in the right part of the waveform (3) in FIG. 2, causing the frequency of the output signal S(109) to be considerably high.

This high frequency of the output signal S(109) will cause abnormal operation of the data reading circuit 101. The supply of the signals S(109), shown in the right part of the waveform (3) in FIG. 2, having short intervals L1, L2, and L3, input to the data reading circuit 101 will prevent the data reading circuit 101 from attaining a normal operation.

Figure 3:
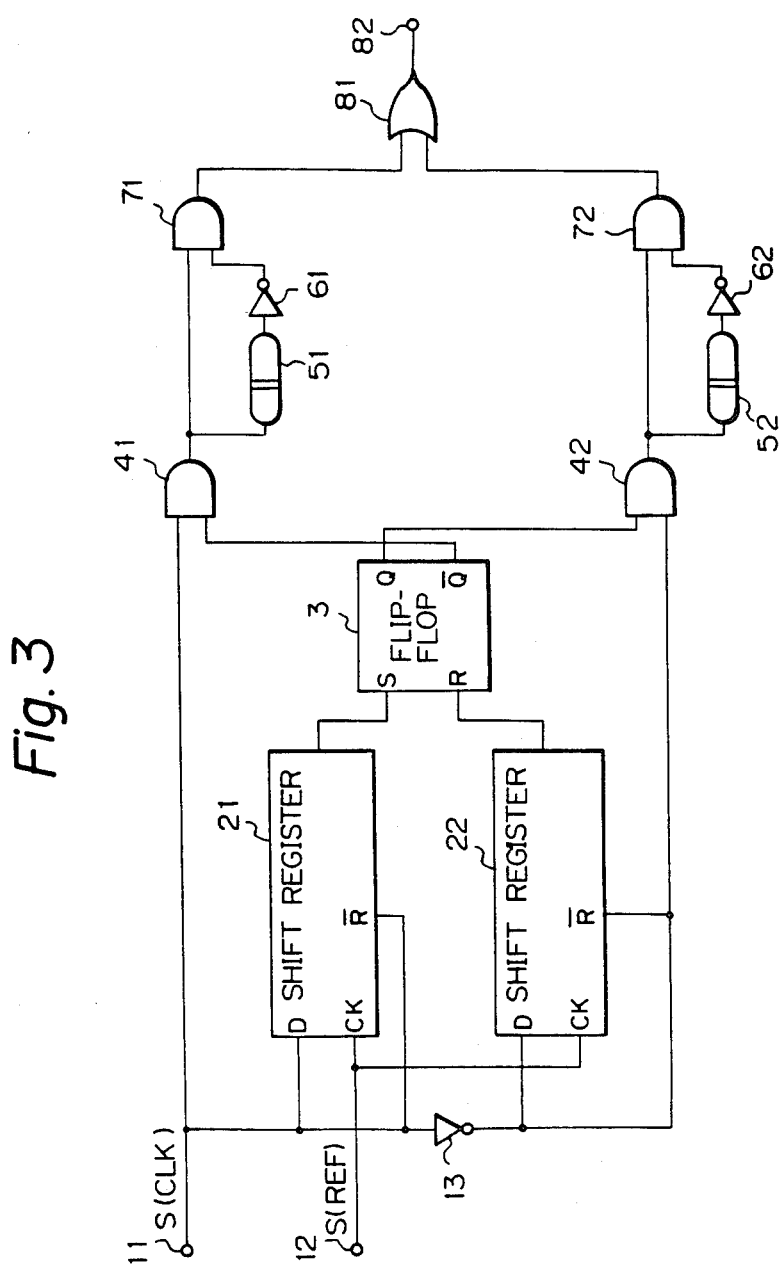
FIG. 3 shows a frequency multiplying circuit according to a preferred embodiment of the present invention.

The arrangement of a frequency multiplying circuit according to a preferred embodiment of the present invention is shown in FIG. 3. The circuit of FIG. 3 includes a clock signal terminal 11, a reference signal input terminal 12, an inverter 13, a first shift register 21 as a first timing means, a second shift register 22 as a second timing means, an R-S flip-flop circuit 3 as a gate timing determination means, AND gates 41 and 42, delay circuits 51 and 52, inverters 61 and 62, AND gates 71 and 72, an OR gate 81, and an output terminal 82.

Clock signal S(CLK), from a phase locked loop circuit, is supplied through the input terminal 11 to the data terminal D and the reset terminal $\bar{R}$ (inverted R) of the shift register 21, the inverter 13, and to one input terminal of the AND gate 41. The output of the inverter 13, which is an inversion of the clock signal, is supplied to the data terminal D and the reset terminal $\bar{R}$ of the shift register 22, and to the AND gate 42. The clock signal S(CLK) has a frequency of, for example, 500 kHz.

A reference signal S(REF) having a predetermined constant frequency is supplied through the input terminal 12 to the clock input terminals CK of the shift registers 21 and 22. The reference signal S(REF) is not synchronized with the clock signal S(CLK).

In each of the shift registers 21 and 22, the RESET state is cancelled when the potential of the reset terminal $\bar{R}$ becomes HIGH. After the cancellation of the RESET state, each time the reference signal pulse S(REF) is supplied to the clock input terminal CK, the HIGH level clock signal S(CLK) (or the inverted clock signal S($\overline{CLK}$)) is shifted into the shift register. The clock signal S($\overline{CLK}$) (or the inverted clock signal S($\overline{CLK}$) is shifted in the shift register, and the delayed clock signal (or the delayed inverted clock signal) is delayed by for example, 4 cycle periods of the reference signal S(REF). The delayed signal is delivered from the output terminal of the shift register. When the potential of the reset terminal $\bar{R}$ becomes LOW, the shift register is in the RESET state and the potential of the output terminal of the shift register also becomes LOW.

Figure 4:
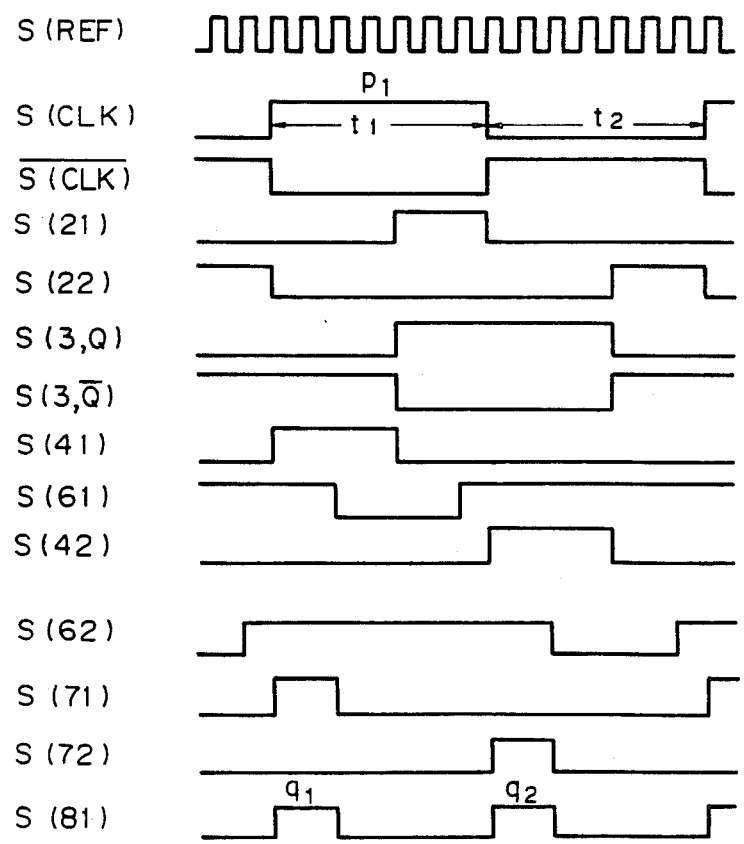
FIGS. 4 through 7 show waveforms of the signals in the frequency multiplying circuit of FIG. 3 corresponding to four examples thereof; and, FIG. 8 shows a data latch circuit which receives the output signal of the frequency multiplying circuit of FIG. 3.

Examples of the waveforms of the signals appearing in the circuit of FIG. 3 are shown in FIGS. 4, 5, 6, and 7. For example, the reference signal S(REF), the input clock signal S(CLK), the inverted input clock signal S($\overline{CLK}$), the output S(21) of the shift register 21, the output S(22) of the shift register 22, the Q output S(3, Q) of the flip-flop circuit 3, the $\bar{Q}$ output S(3, $\bar{Q}$) of the flip-flop circuit 3, the output S(41) of the AND gate 41, the output S(61) of the inverter 61, the output S(42) of the AND gate 42, the output S(62) of the inverter 62, the output S(71) of the AND gate 71, the output S(72) of the AND gate 72, and the output S(81) of the OR gate 81 are shown in FIG. 4.

The shift register 21 delivers a HIGH level set signal S(21) when the HIGH level period of the input clock signal S(CLK) exceeds 4 cycle periods of the reference signal S(REF), and the delivered signal S(21) is supplied to the set terminal S of the SR flip-flop circuit 3.

The shift register 22 delivers a HIGH level reset signal S(22) when the LOW level period of the input clock signal S(CLK) exceeds 4 cycle periods of the reference signal S(REF), and the delivered signal S(22) is supplied to the reset terminal R of the SR flip-flop circuit 3.

The internal state of the flip-flop circuit 3 is reversed by a set signal and a reset signal incoming through the set terminal S and the reset terminal R, so that the signal S(3, Q) from the Q terminal is supplied to one input terminal of the AND gate 42 and the signal S(3, $\bar{Q}$) from the $\bar{Q}$ terminal is supplied to one input terminal of the AND gate 41.

The AND gate 41 passes the clock signal S(CLK) during the period in which the potential of the signal S(3, $\bar{Q}$) is HIGH level. The output clock signal of the AND gate 41 is supplied to one input terminal of the AND gate 71 and to the delay circuit 51. The output S(51) of the delay circuit 51, which is delayed by a predetermined amount of time, for example, 2 cycle periods of the reference signal S(REF) from the input S(41) of the delay circuit 51, is inverted by the inverter 61. The output S(61) of the inverter 61 is supplied to the other input terminal of the AND gate 71.

Accordingly, after the LOW level period of the input clock signal S(CLK) exceeds 4 cycle periods of the reference signal S(REF) and the potential of the $\bar{Q}$ output S(3, $\bar{Q}$) of the flip-flop circuit becomes HIGH, and when the potential of the clock signal S(CLK) rises, the AND gate 71 produces a first pulse S(71) having a length of, for example, 2 cycle periods of the reference signal S(REF). The produced first pulse S(71) is supplied to the OR gate 81.

The AND gate 42 passes the inverted clock signal during the period in which the potential of the signal S(3, Q) is HIGH. The output inverted clock signal of the AND gate 42 is supplied to one input terminal of the AND gate 72 and to the delay circuit 52. The output S(52) of the delay circuit 52, which is delayed by a predetermined amount of time, for example, 2 cycle periods of the reference signal S(REF) from the input S(42) of the delay circuit 52, is inverted by the inverter 62. The output S(62) of the inverter 62 is supplied to the other input terminal of the AND gate 72.

Accordingly, after the HIGH level period of the input clock signal S(CLK) exceeds 4 cycle periods of the reference signal S(REF) and the potential of the Q output S(3, Q) of the flip-flop circuit 3 becomes HIGH, and when the potential of the clock signal S(CLK) falls, the AND gate 72 produces a second pulse S(72) having a length of, for example, 2 cycle periods of the reference signal S(REF). The produced second pulse S(72) is supplied to the OR gate 81.

The OR gate 81 to which the first and second pulses S(71) and S(72) are supplied produces a pulse signal S(81) which is delivered from the output terminal 82.

In accordance with the sequence of the levels of the input clock signal S(CLK), the following four examples of the operation of the frequency multiplying circuit of FIG. 3 are considered.

(Case-1)

Each HIGH level period and LOW level period of the potential of the input clock signal S(CLK) exceeds 4 cycle periods of S(REF). The waveforms of the signals in Case-1 are shown in FIG. 4.

In the case of FIG. 4, each HIGH level potential period t1 and LOW level potential period t2 of S(CLK) exceeds 4 cycle periods of S(REF). The setting and the resetting of the flip-flop circuit 3 are carried out at 4 cycle periods of the S(REF) after a rising edge or a falling edge of the S(CLK), as shown in S(21) and S(22) respectively. The Q and $\bar{Q}$ outputs of the flip-flop circuit 3 are as shown in S(3, Q) and S(3, $\bar{Q}$). The outputs of the AND gates 41 and 42 are as shown in S(41) and S(42). The outputs of the delay circuits 51 and 52, which are delayed by 2 cycle periods of S(REF) from the inputs, are as shown in S(61) and S(62). The outputs of the AND gates 71 and 72 are as shown in S(71) and S(72). Thus, the output signal q1, q2, ... of the OR gate 81 is as shown in S(81).

Accordingly, in the case of FIG. 4, the frequency of the output signal S(81) is twice that of the input clock signal S(CLK).

(Case-2)

The length of the preceding LOW level period of the potential of the input clock signal S(CLK) exceeds 4 cycle periods of S(REF), and the length of the present HIGH level period of the potential of the input clock signal S(CLK) is less than 4 cycle periods of S(REF). The waveforms of the signals in Case-2 are shown in FIG. 5.

Figure 5:
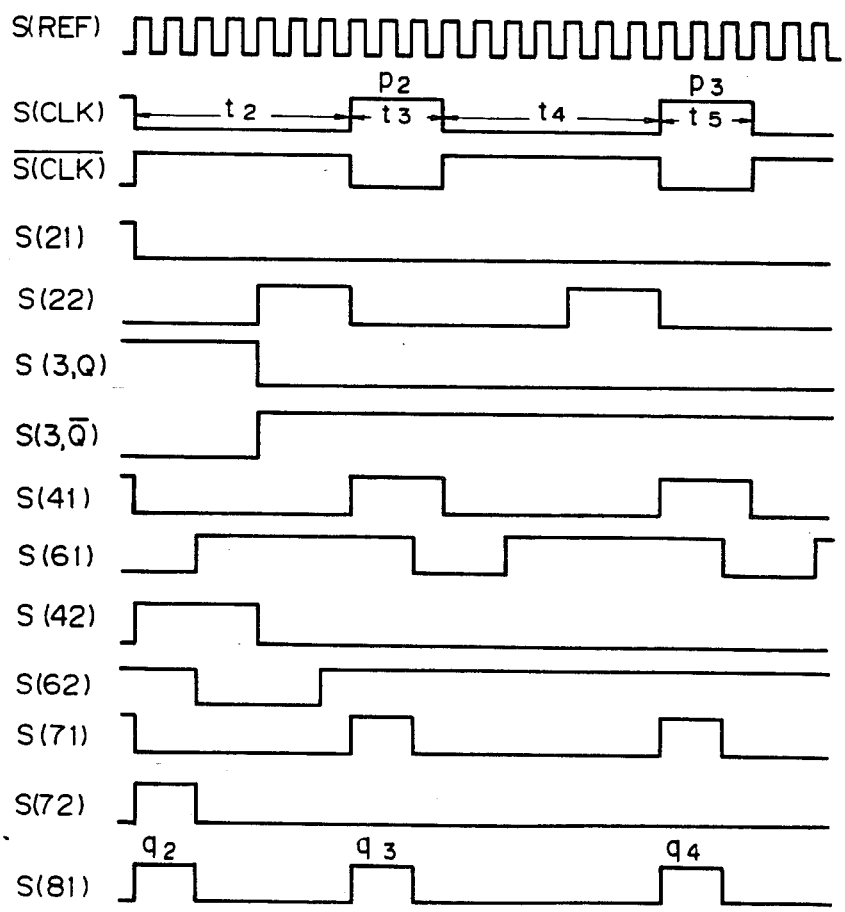

In the case of FIG. 5, the preceding LOW level periods t2 and t4 exceed 4 cycle periods of S(REF), and the present HIGH level periods t3 and t5 are less than 4 cycle periods of S(REF).

The input clock signal S(CLK) is not delivered from the shift register 21. After 4 cycle periods of S(REF) from the falling edge of S(CLK), the reversal of the outputs of the flip-flop circuit 3 does not take place, so that the potential of the $\overline{Q}$ output S(3, $\overline{Q}$) of the flip-flop circuit 3 is maintained at a HIGH level.

The outputs of the AND gate 41, the inverter 61, the AND gate 42, the inverter 62, the AND gate 71, and the inverter 72 are as shown in S(41), S(61), S(42), S(62), S(71), and S(72). The AND gate 71 delivers the output pulses at the rising edges of the input clock pulses S(CLK), but the AND gate 72 does not deliver the output pulses. Therefore, the OR gate 81 delivers only the signals q3, q4, ... as shown in S(81).

Accordingly, the frequency of the output signal is not a multiple of the frequency of the input clock signal but is maintained at the frequency of the input clock signal.

(Case-3)

The length of the preceding HIGH level period of the potential of the input clock signal S(CLK) exceeds 4 cycle periods of S(REF), and the length of the present LOW level period of the potential of the input clock signal S(CLK) is less than 4 cycle periods of S(REF). The waveforms of the signals in Case-3 are shown in FIG. 6.

Figure 6:
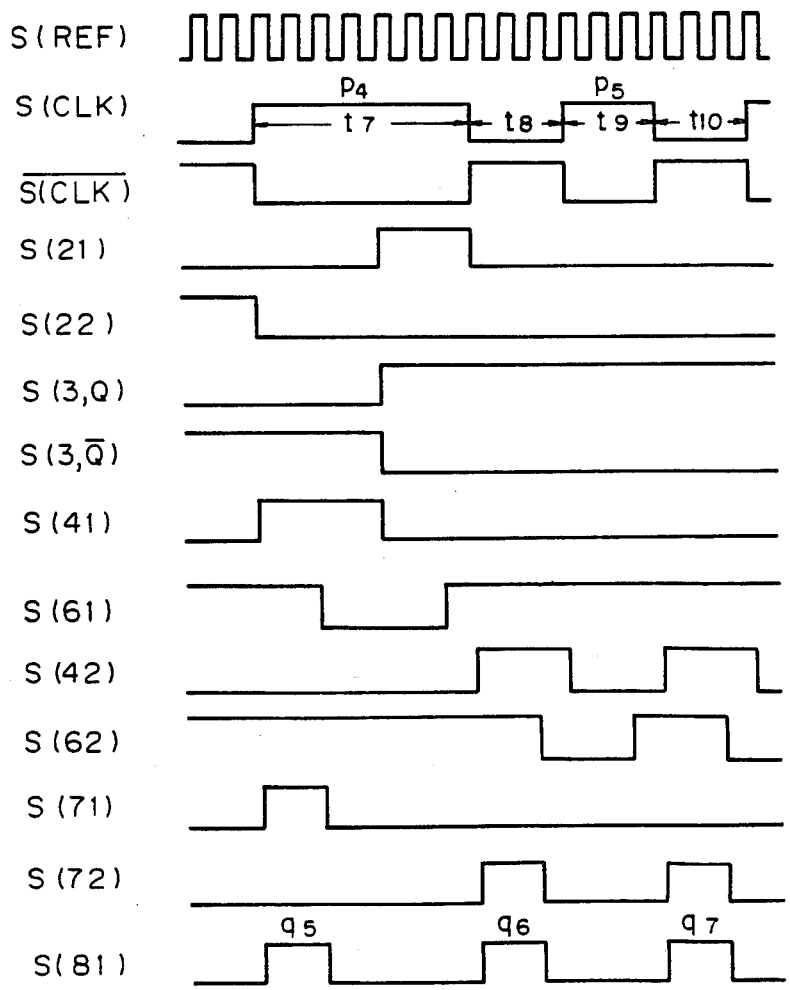

In the case of FIG. 6, the preceding HIGH level period t7 exceeds 4 cycle periods of S(REF), and the present LOW level period t8 is less than 4 cycle periods of S(REF).

The outputs of the shift registers 21 and 22 are as shown in S(21) and S(22). At the time of the pulse p5, the reversal of the outputs of flip-flop circuit 3 does not take place, so that the potential of the Q output S(3, Q) is maintained at a HIGH level, and the potential of the $\overline{Q}$ output S(3, $\overline{Q}$) is maintained at a LOW level.

The outputs of the AND gate 41, the inverter 61, the AND gate 42, the inverter 62, the AND gate 71, and the inverter 72 are as shown in S(41), S(61), S(42), S(62), S(71), and S(72). The outputs q5, q6, q7, ... of the OR gate 81 are as shown in S(81).

The pulses q5 and q6 are produced immediately after the rising and the falling edges of the input clock signal p4, and the pulse q7 is produced immediately after the falling edges of the input clock signal p5.

Accordingly, after the input of the clock signal p5, the frequency of the output signal is not a multiple of the frequency of the input clock signal but is maintained at the same frequency of the input clock signal.

(Case-4)

Each HIGH level and LOW level period of the input clock signal S(CLK) is less than 4 cycle periods of S(REF). The waveforms of the signals in Case-4 are shown in FIG. 7.

Figure 7:
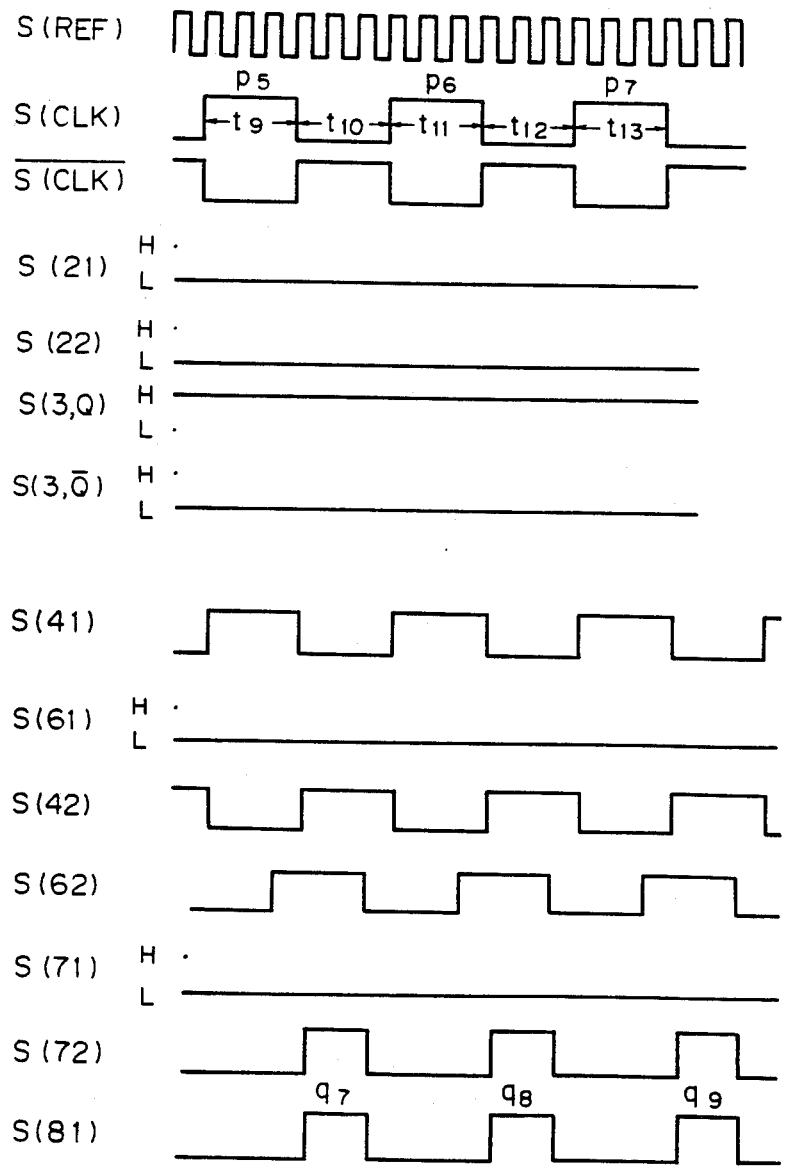

In the case of FIG. 7, each of the HIGH level periods t9, t11, t13, ... and the LOW level periods t10, t12, ... is less than 4 cycle periods of S(REF).

In the case of FIG. 7, each of the potentials of the outputs of the shift registers 21 and 22 is maintained at a LOW level. The Q output S(3, Q) of the flip-flop circuit 3 is maintained at a HIGH level, and the $\overline{Q}$ output S(3, $\overline{Q}$) of the flip-flop circuit 3 is maintained at a LOW level.

The outputs of the AND gate 41, the inverter 61, the AND gate 42, the inverter 62, the AND gate 71, and the inverter 72 are as shown in S(41), S(61), S(42), S(62), S(71) and S(72). The outputs q7, q8, q9, ... of the OR gate 81 are as shown in S(81). The pulses q7, q8, q9, ... are produced only immediately after the falling edges of the input clock signals p5, p6, p7 ....

Accordingly, the frequency of the output signal is not multiplied by the frequency of the input clock signal but is maintained at the same frequency of the input clock signal.

Figure 8:
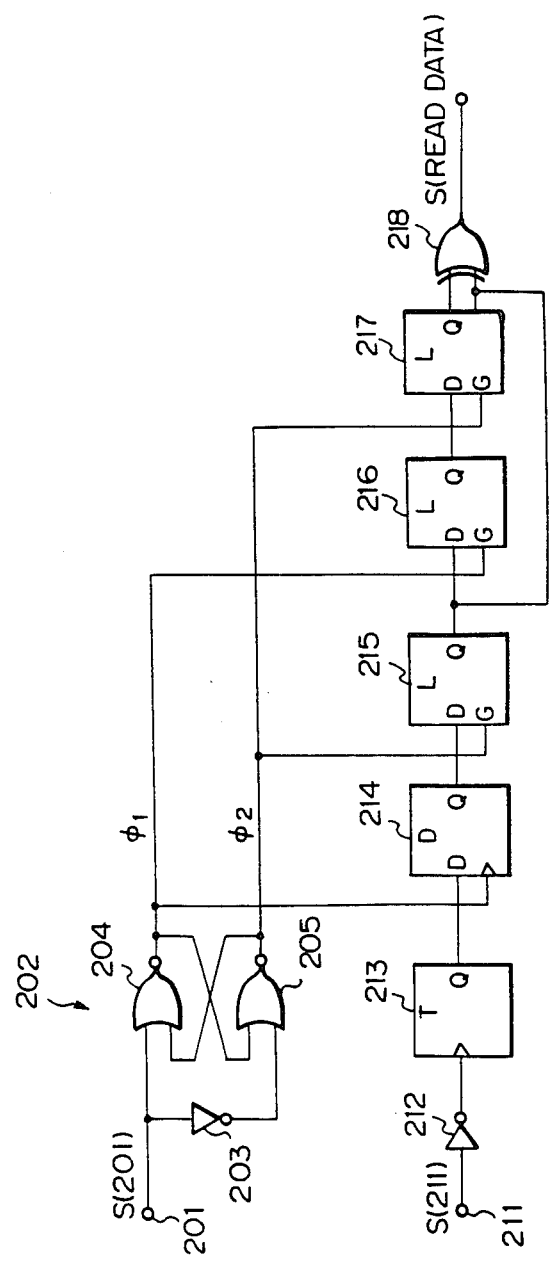

The output signal S(81) of the frequency multiplying circuit of FIG. 3 is used for an input clock signal S(201) to a data latch circuit shown in FIG. 8 which functions as a data reading circuit. The data latch circuit shown in FIG. 8 includes a circuit 202 for generating double cycle period clock signals $\phi_1$ and $\phi_2$, a toggle flip-flop circuit 213, a D type flip-flop circuit 214, a sequence of three latch elements 215, 216, and 217, and an exclusive OR gate 218. The latch circuit shown in FIG. 8 delivers an output signal S(READ DATA) from the exclusive OR gate 218.

In the data latch circuit shown in FIG. 8, the double cycle period clock signals $\phi_1$ and $\phi_2$ delivered from the circuit 202 are supplied to one input terminal of the D type flip-flop circuit 214 and the Latch elements 215, 216, and 217.

What is claimed is:

1. A frequency multiplying circuit comprising:
   input terminal means for receiving an input pulse signal having HIGH and LOW logic levels;
   first time counting means, responsive to the received input pulse signals and a reference timing signal, for producing a first detection signal when the HIGH levels of the input pulse signals are longer than a predetermined length determined by said reference timing signal;
   second time counting means, responsive to the received input pulse signals and said reference timing signal, for producing a second detection signal when the LOW levels of the input pulse signals are longer than a predetermined length determined by said reference timing signal;
   gate timing determination means, responsive to said first detection signal and to said second detection signal, for providing a gate signal in response to said first detection signal, and for providing another gate signal in response to said second detection signal;
   first pulse generating means, responsive to one of said gate signals and said received input signal, for detecting a rising edge of said input pulse signals, and for generating first pulses in response to the detected rising edge;

second pulse generating means, responsive to another one of said gate signals and said received input signals, for detecting a falling edge of said input pulse signals, and for generating second pulses in response to the detected falling edge;

output means, for receiving said first and second pulses, and for providing a frequency multiplied output of said input pulse signals based on said first and second pulses;

whereby the frequency multiplication of said input pulse signals is prohibited when the frequency of said input pulse signals is higher than a predetermined frequency.

2. A frequency multiplying circuit according to claim 1, wherein said first pulse generating means comprises:

means for providing a first detected signal, in accordance with one of said gate signals and a rising edge of said input pulse signals;

first delay circuit means, for delaying by a predetermined period, said first detected signal and for providing a first delay signal; and first output circuit means, for providing an output of said first pulses, by combining said first detected signal and said first delay signal.

3. A frequency multiplying circuit according to claim 1, wherein said second pulse generating means comprises:

means for providing a second detected signal, in accordance with another one of said gate signals and a falling edge of said input pulse signals;

second delay circuit means, for delaying by a predetermined period, said second detected signal and for providing a second delay signal; and second output circuit means, for providing an output of said second pulses by combining said second detected signal and said second delay signal.

4. A frequency multiplying circuit according to claim 1, wherein said first pulse generating means comprises:

first input AND circuit means for providing a logic AND function in accordance with one of said gate signals and a rising edge of the input pulse signals and for providing a first detected signal;

first delay circuit means for delaying said first detected signal by a predetermined period of time and for providing a first delay signal;

first output AND circuit means for providing a logic AND function in accordance with said first detected signal and said first delay signal and for providing said first pulses.

5. A frequency multiplying circuit according to claim 1, wherein said second pulse generating means comprises:

second input AND circuit means for providing a logic AND function in accordance with one of said gate signals and a falling edge of the input pulse signals and for providing a second detected signal;

second delay circuit means for delaying said second detected signal by a predetermined period of time and for providing a second delay signal; and second output AND circuit means for providing a logic AND function in accordance with said second detected signal and said second delay signal and for providing said second pulses.

6. A frequency multiplying circuit according to claim 1, wherein said first time counting means comprises a shift register circuit means for receiving the input pulse signals and for providing said first detection signal.

7. A frequency multiplying circuit according to claim 1, wherein said second time counting means comprises a shift register circuit means for receiving the input pulse signals and for providing said second detection signal.

8. A frequency multiplying circuit according to claim 1, wherein said gate timing determination means comprises a flip-flop circuit means for receiving said first and second detection signals and for providing said gate signals.

9. A frequency multiplying circuit according to claim 1, wherein said output means comprises an OR-gate means for receiving said first and second pulses and for providing said frequency multiplied output.

* * * * *